April 19, 1955 W. R. GRAY 2,706,550
APPARATUS FOR ISSUING FORMS AND COIN
ACTUATED CONTROL MECHANISM THEREFOR
Filed April 21, 1952 6 Sheets-Sheet 1

INVENTOR.
WALTER R. GRAY
BY Jennings & Carter
ATTORNEYS

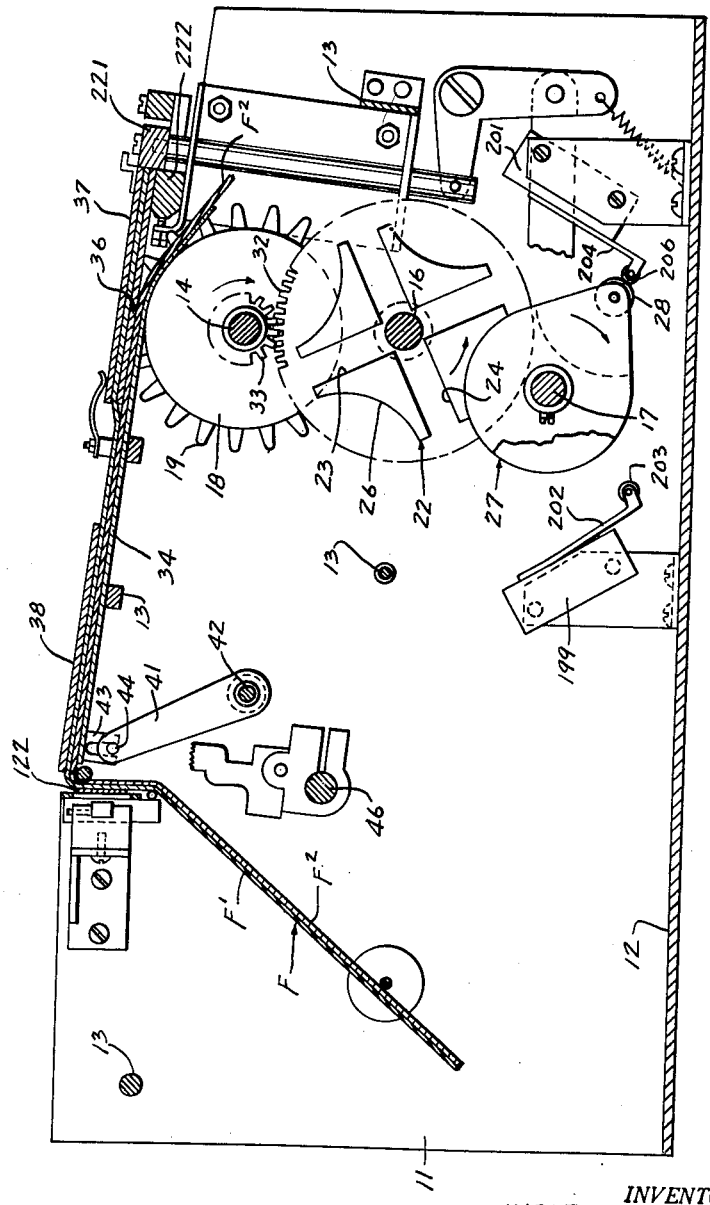

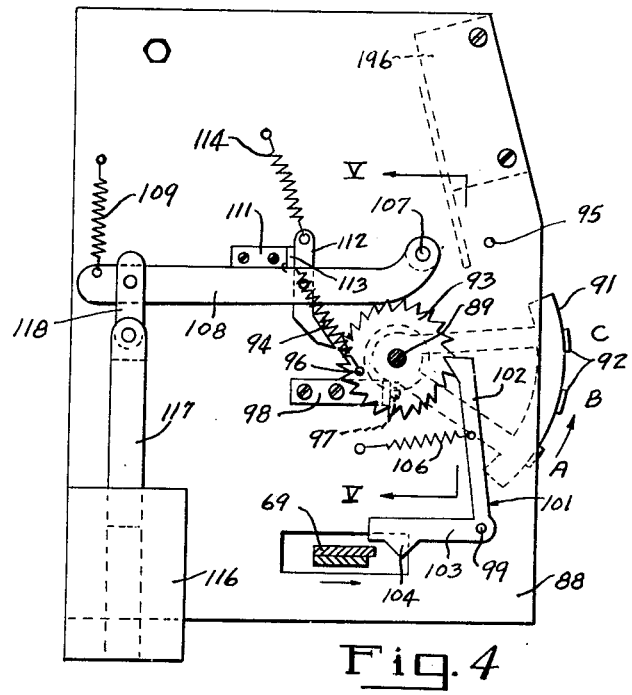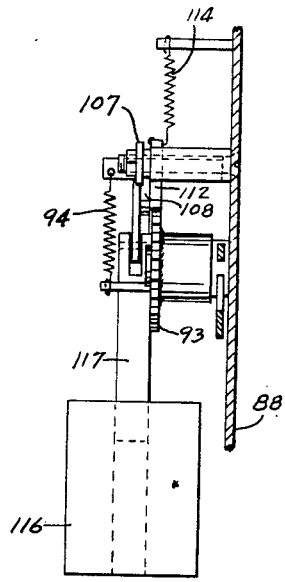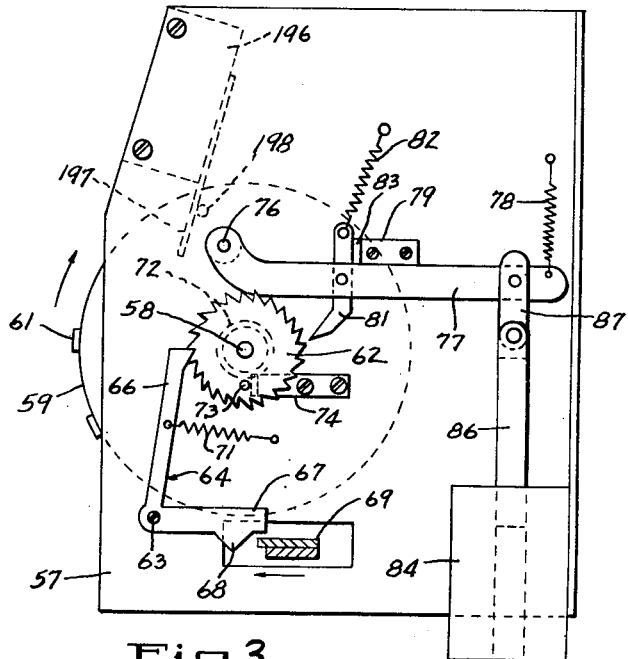

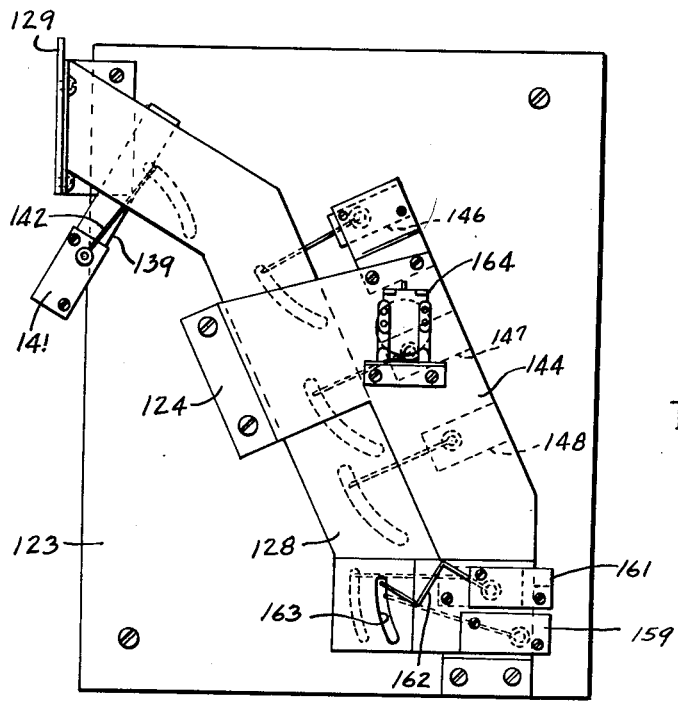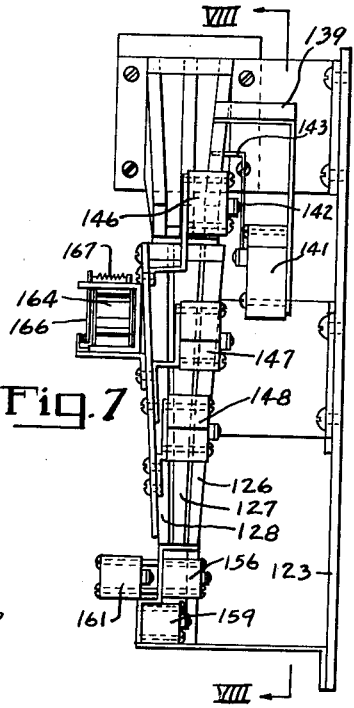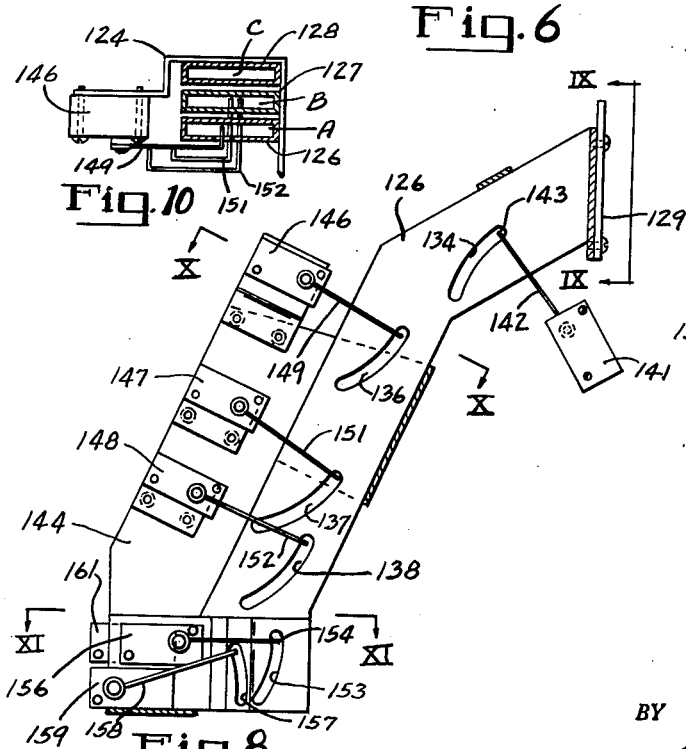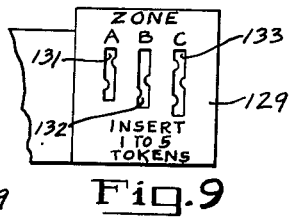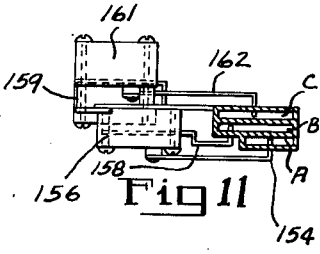

United States Patent Office 2,706,550
Patented Apr. 19, 1955

2,706,550

APPARATUS FOR ISSUING FORMS AND COIN ACTUATED CONTROL MECHANISM THEREFOR

Walter R. Gray, Glendale, Calif., assignor, by mesne assignments, to The Independence Life Insurance Company, a corporation of North Carolina Application April 21, 1952, Serial No. 283,445

9 Claims. (Cl. 194—10)

My present invention relates to form issuing apparatus and relates more particularly to a coin actuated insurance policy vending machine having mechanism for setting indexible printing means thereof, whereby the policies to be issued have printed thereon the amount of the policy and indicia showing the territorial zone within which the policy is effective, all as determined by the value of one or more coins or tokens inserted in the apparatus.

As used throughout the present specification and claims the expressions "token" and "coin" are used interchangeably.

In my co-pending application, Serial Number 207,977, filed January 26, 1951, Apparatus for Issuing Paper Forms and the Like, I show, describe and claim form issuing apparatus which, except for the addition of the zone printing mechanism to be described herein, is suitable for use with the improvements shown, described and claimed in the present application. As will hereinafter appear the apparatus of the above identified co-pending application involves essentially form feeding mechanism and amount printing mechanism, actuated by solenoids and a coin controlled electric motor.

In the issuance of policies of accident insurance, such for instance as those issued to airline passengers, it has been customary to issue policies for a given consideration and which covered travel throughout the entire United States. My present invention is concerned with apparatus especially adapted to issue policies of accident insurance which cover the passenger for international travel, especially travel on scheduled airlines throughout the entire world. To this end the world may be divided into territorial zones, which I designate herein by the letters A, B and C, and the policies are issued for a given consideration in zone A and for proportionately larger considerations in zones B and C.

In providing apparatus for issuing policies of the foregoing kind it is desirable that they be issued in increments of for instance $5,000.00 up to a maximum amount, which may be $25,000.00, at the option of the purchaser. At the same time, it is necessary that the machine be equipped to print on the policy the zone in which the same is effective. Further, it is highly desirable that the same coin or token used to select the amount or face value of the policy also determine the effective zone of the policy, thereby simplifying the actual operation of the apparatus from the customer's standpoint. Controls for the two indexible printing mechanisms, therefore, preferably are correlated so that the insertion of coins in the apparatus sets the amount mechanism and also sets the zone mechanism.

In view of the foregoing an object of my invention is to provide apparatus of the character designated embodying token mechanism having a plurality of chutes, the chutes being adapted to receive tokens of different denominations, there being a series of token actuated electric switches associated with the chutes and controlling the indexible amount and indexible zone printing means, the switches and circuits being so arranged that the insertion of a token of the lowest denomination determines the setting of the zone means and amount means and which nevertheless causes step by step actuation of the amount means upon the insertion of additional tokens of any denomination, whereby, the machine will not issue a policy for a zone more expensive than the price represented by the value of the token or tokens inserted.

My invention contemplates an indexible zone printing quadrant or wheel initially set to print on the policy an indicia representing the zone of greatest territorial extent, that is, the zone for which the highest consideration will be charged, and in which the chute for the largest denomination tokens has associated therewith a switch effective to actuate only the amount printing mechanism, whereby the insertion of one or more such tokens is ineffective to index the zone wheel, causing the same to print the correct zone indicia on the policy during the issuance thereof.

My invention further contemplates an arrangement of electric switches disposed for actuation by tokens of different denominations placed in separate chutes therefor, together with suitable circuits connecting said switches to the indexible zone and amount wheels, some of the switches preferably being common to two of the coin chutes and the entire assembly being constructed and arranged, by the means hereinafter disclosed, to set the printing mechanisms only in accordance with the value of tokens inserted therein.

Apparatus illustrating the features of my invention is shown in the accompanying drawings forming a part of this application in which:

Fig. 2 is a detail sectional view taken generally along line II—II of Fig. 1;

Fig. 3 is a detail sectional view taken generally along line III—III of Fig. 1 and showing certain portions of the indexible amount printing wheel;

Fig. 4 is a detail sectional view taken generally along line IV—IV of Fig. 1 and showing certain of the details of the indexible zone indicia printing mechanism;

Fig. 5 is a detail sectional view taken generally along line V—V of Fig. 4;

Fig. 6 is a side elevational view of the coin chutes and certain of the electric switches associated therewith;

Fig. 7 is an end elevational view of the coin mechanism shown in Fig. 6;

Fig. 8 is a detail sectional view taken generally along line VIII—VIII of Fig. 7;

Fig. 9 is an end elevational view of the slotted token receiving plate covering the entrance to the coin chutes, the view being taken in the direction of the arrows IX—IX of Fig. 8;

Fig. 10 is a detail sectional view taken generally along line X—X of Fig. 8;

Fig. 11 is a detail sectional view taken generally along line XI—XI of Fig. 8;

Figure 1:
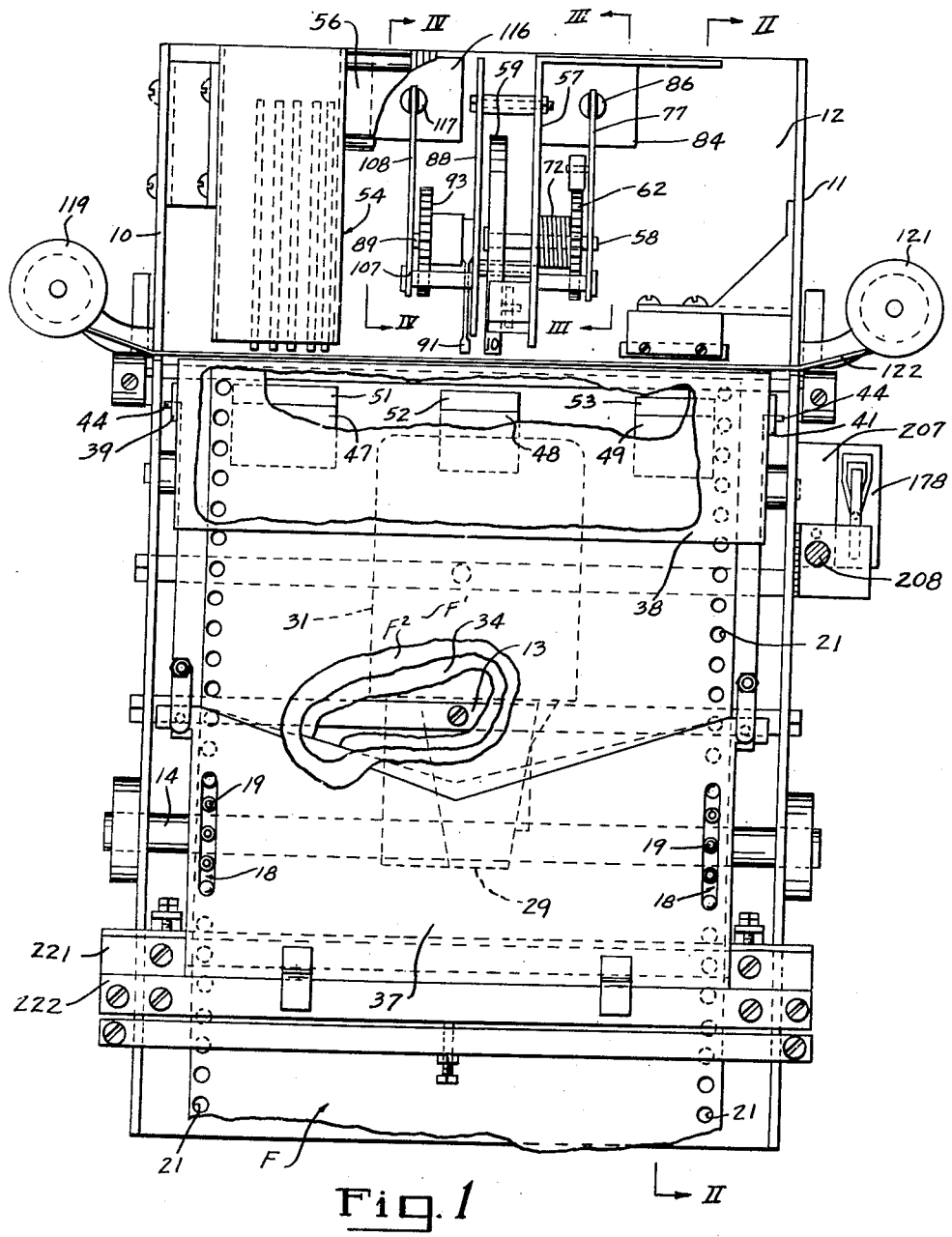
Fig. 1 is a plan view, partly broken away and in section of the form issuing apparatus proper showing the same in the process of issuing a form.

Referring more particularly to Figs. 1 and 2, I show a machine which is effective to issue a single policy form from a continuous sheet of the same. It will be understood that the object of the apparatus insofar as the actual issuance of the form is concerned is to issue one copy to the customer and for the machine itself to retain a second, duplicate copy. The apparatus consists of a frame embodying vertically disposed side plates 10 and 11. The side plates may be cross connected at their lower ends by means of a bottom plate 12 and the side plates may be further braced by means of a suitable number of cross members, some of which are indicated by the numeral 13.

Mounted for rotation in suitable bearings carried by the frame members 10 and 11 is an upper cross shaft 14, an intermediate cross shaft 16 and a lower cross shaft 17. Non-rotatably mounted on the upper shaft 14 are a pair of form feeding wheels 18, each of which carries a number of upstanding pins 19 on the periphery thereof. The pins are adapted to engage in marginally disposed rows of holes 21 formed in the continuous sheet F from which the policy is to be issued. Mounted on the intermediate shafts 16 is the driven member 22 of a Geneva motion intermittent drive mechanism. The member 22 is provided with cross slots 23 and 24 and arcuately curved locking segments 26.

Mounted on the lower shaft 17 is the driving member 27 of the Geneva motion. The member carries a roller 28 adapted to enter the slots 23 and 24, thus to rotate the shaft 16 one-fourth of a revolution for each revolution of shaft 17. Shaft 17 is driven through a reduction gear box 29, in turn driven by an electric motor 31. The drive to the shaft 14 is completed by the provision of a gear 32 fast on shaft 16 and a pinion 33 fast on shaft 14. The ratio between the gears 32 and 33 and the circumference of the pin wheels 18 is such that for each one-fourth revolution of shaft 16 a form is issued from the apparatus as will be exlained.

The sheet of forms F starts through the apparatus in correlated form, the original being indicated by the designation F' and the duplicate copy being designated F2. The underside of the top or original copy F' is suitably coated with carbon material called "saddleback" so that when the printing mechanisms operate upon the correlated forms as will be explained the second copy F2 is also printed upon. The forms pass over a supporting plate 34 strong enough to permit a person to write in by hand certain information on the form. The original and duplicate copies are separated by means of a divider plate 36. A hold down plate 37 is provided over the plate 36.

Slidably mounted over the topmost form is a cover plate 38 which, when the machine is at rest, covers the heading where the operator is to write in data on the form to be issued. This plate may be moved rearwardly during the operation of the apparatus by means of a pair of arms 39 and 41 mounted on an oscillatable shaft 42. The plate 38 has depending slotted lugs 43 which are engaged by pins 44 carried by the arms 39 and 41. The shaft 42 is oscillated rearwardly during the operation of the apparatus through suitable linkage mechanism not shown, operatively connected to shaft 17.

Mounted on a cross shaft 46 are three hammer arms 47, 48 and 49. The hammer arms carry rubber platens 51, 52 and 53, respectively. The hammers are actuated once during the operation of the apparatus whereby upon forward movement of the platens thereof they co-act with the means now to be described to print certain information upon the forms.

Rearwardly of hammer 47 is a time and date clock mechanism indicated generally by the numeral 54. This mechanism has a number of wheels therein which are effective to maintain in printing position information representing the time of day, the date and the month. The clock is driven in the manner well understood by means of a small electric motor, indicated at 56.

Rearwardly of hammer 48 and co-acting therewith is an indexible amount mechanism, the details of which are more clearly shown in Fig. 3. This mechanism comprises a plate 57 which serves as a mounting means for the several parts now to be described. Projecting outwardly of a side of the plate 57 is a shaft 58. Mounted on the shaft 58 is an amount wheel 59 which has on the periphery thereof raised pads of type 61 representing various amounts of the policy to be issued, for instance $5,000.00, $10,000.00, $15,000.00, $20,000.00 and $25,000.00. Mounted on the shaft 58 is a ratchet gear 62. Pivotally mounted at 63 is a holding pawl 64 having an arm 66 adapted to engage the gear 62 to prevent reverse rotation of shaft 58. At the lower end of the pawl 64 is another arm 67 carrying a V-shaped projection 68 which is adapted to be struck by a forwardly moving portion of the apparatus indicated at 69. The pawl is biased into engagement with the wheel by means of a spring 71.

The shaft 58 is biased counterclockwise as viewed in Fig. 3 by means of a coil spring 72. The gear may be provided with a pin 73 disposed to engage a limit stop 74 carried by the plate 57.

Pivotally mounted on the plate 57 as at 76 is an arm 77. Arm 77 is biased upwardly by means of a spring 78 into engagement with a stop 79 carried by the plate 57. Mounted on the arm is a pivoted actuating pawl 81 which is biased in the manner shown by means of a spring 82. It will be noted that when the arm 77 is in the upper position illustrated in Fig. 3 the rear side of the pawl 81 contacts an outturned portion 83 of the stop, disengaging the lower end of the pawl from the ratchet 62.

Also mounted on the plate is a solenoid 84 having an armature 86. The armature is pivotally connected to the arm 77 by means of a link 87.

From what has been said it will be apparent that when the solenoid 84 is energized the armature 86 moves downwardly, permitting the pawl 81 to engage the ratchet gear 62 thereby to rotate the shaft 58 and hence the wheel 59 one step. Thus, the pad 61 carrying the lowest figure, for instance $5,000.00, is first brought into printing position upon one actuation of the solenoid 84 and for each subsequent actuation thereof the next higher raised pad of type is brought into printing position, all as will more readily appear as the description proceeds.

Mounted adjacent the amount wheel mechanism just described is the zone indicating mechanism. This mechanism comprises a plate 88. Rotatably mounted on the plate 88 is a shaft 89 which has fixedly mounted thereon a quadrant 91 having raised pads 92 thereon. The pads carry indicia, for instance the letters A, B and C as illustrated in Fig. 4. The letter A represents that the policy is issued for a zone of less territorial extent than that indicated by the letter B, and the latter indicates that a policy stamped with the letter B thereon is for a zone of less territorial extent than one bearing the letter C.

Mounted on the shaft 89 is a ratchet gear 93. The shaft 89 is biased clockwise as shown in Fig. 3 by means of a spring 94 anchored to a pin 96 on the side of the gear 93 and at the other end to a member later to be described. Inducing movement of the quadrant is limited by means of a stop 95 carried by the plate 88. The spring 94 biases a pin 97 carried by the gear into contact with a stop 98.

Pivotally mounted to the plate 88 as at 99 is a pawl arm 101, similar to the pawl arm 64. The upper end of arm 102 of the pawl 101 engages the ratchet gear 93. The lower arm thereof indicated at 103 carries a V-shaped extension 104 which lies in the path of the movable mechanism 69. The pawl 101 is biased into engagement with the gear by means of a spring 106.

Pivotally mounted to the plate 88 as at 107 is one end of an arm 108. The arm 108 is biased upwardly by means of a spring 109 into engagement with a stop 111. Pivotally mounted on the arm 108 is an actuating pawl 112 which is spring biased into engagement with a stop 113 by means of a spring 114.

Mounted on the plate 88 is a second solenoid 116 having an armature 117. The armature is pivotally connected to the arm 108 by means of a link 118. From the description just given, it will be seen that upon energization of solenoid 116, shaft 89 and hence quadrant 91 are rotated one step. It will be noted that the pad of type 92 bearing the letter C, representing the highest zone is in printing position before the solenoid 116 is energized. It will be further noted that the next indicia pad is that representing the intermediate zone whereas the lowermost one with respect to direction of rotation of the quadrant 91 is the cheapest zone, that is, the one of least territorial extent. It will be apparent that for the quadrant 91 to advance to a position to print the letter B on a policy only one energization of the solenoid 116 is necessary. However, to bring the pad of type bearing the letter A into position it will be apparent that two momentary energizations of the solenoid are required. This fact will become important in connection with the description of the token mechanism.

Referring again to Figs. 1 and 2 it will be seen that the machine is provided with a ribbon mechanism comprising spools 119 and 121 on which is wound a ribbon 122. Through suitable means, not shown, the ribbon is fed intermittently across the apparatus thereby to present a different place thereon for printing. The movable portion of the apparatus indicated by the bar 69 may conveniently be a part of the ribbon shifting mechanism. With respect to the mechanism shown in Figs. 3 and 4 the bar 69 serves the purpose of permitting the springs 72 and 94 to return the respective wheel 59 and quadrant 91 to the position shown in Figs. 3 and 4. Stated differently, once during each cycle of operation the bar 69 moves toward the V-shape projections of the pawl arms, withdrawing the upper ends of the same from the respective ratchet gears and permitting the mechanisms to return to start position.

Referring now more particularly to Figs. 6 to 11, inclusive, my improved token mechanism will now be described. Mounted in any suitable manner, in proximity to the machine previously described, as for instance in the cabinet for the entire mechanism, not shown, is a plate 123. Mounted on a bracket 124 secured to the plate 123 are three token chutes. The chutes are numbered 126, 127 and 128 representing respectively zones A, B and C. Over the upper ends of the chutes is a plate 129 having therein slots for each of the zones indicated by the numerals 131, 132 and 133. The slots may be key-cut as indicated, whereby they are adapted to receive only those tokens having matching grooves therein.

Chute 126 has in a side thereof arcuate openings 134 136, 137, and 138. Mounted on a bracket 139 is an electric switch 141 which is spring biased toward open position. The switch 141 has an arm 142 with an inturned portion 143 disposed in the path of tokens moving down the chute 126. Mounted on a plate 144 are other switches 146, 147, 148. These switches have respective switch arms 149, 151 and 152 which are provided with inturned ends projecting through the slots 136, 137 and 138 respectively, thereby the ends thereof lie in the path of tokens moving down the chute 126. All of the switches are spring biased to open position, similar to switch 141. The lower end of the chute 126 is provided with an additional slot 153 to receive the inturned end of the arm 154 of a switch 156. This switch also is spring biased to open position.

Token chute 127 is provided with slots in the side wall corresponding to and in alignment with the slots 136 and 137 in the side walls of the chute 126. The ends of the switch arms 149 and 151 are sufficiently long to project into the token chute 127, whereby the switches 146 and 147 are momentarily closed whenever a token is dropped into the slot or chute 127, in the same manner as when a token drops through chute 126. At its lower end the chute 127 is provided with an arcuate slot 157 to receive the inturned end of a switch arm 158 of a switch 159, also spring biased to open position.

The token chute 128 is provided with a single switch 161 adjacent the lower end thereof, biased to open position. This switch has an arm 162 connected thereto which has an inturned end lying in the path of tokens moving down the chute 128. The arm 162 projects through an arcuate slot 163 in the side of chute 128.

From what has just been said it will be seen that whenever a coin is dropped into chute 126, marked zone A on the plate 129, switches 141, 146, 147, 148 and 156 are momentarily and sequentially closed. Whenever a token is dropped into chute 127, marked zone B on the plate 129, switches 147, 148 and 159 are momentarily and sequentially closed. Whenever a token is dropped into chute 128, marked zone C on the plate 129, only switch 161 is momentarily closed.

Figure 12:
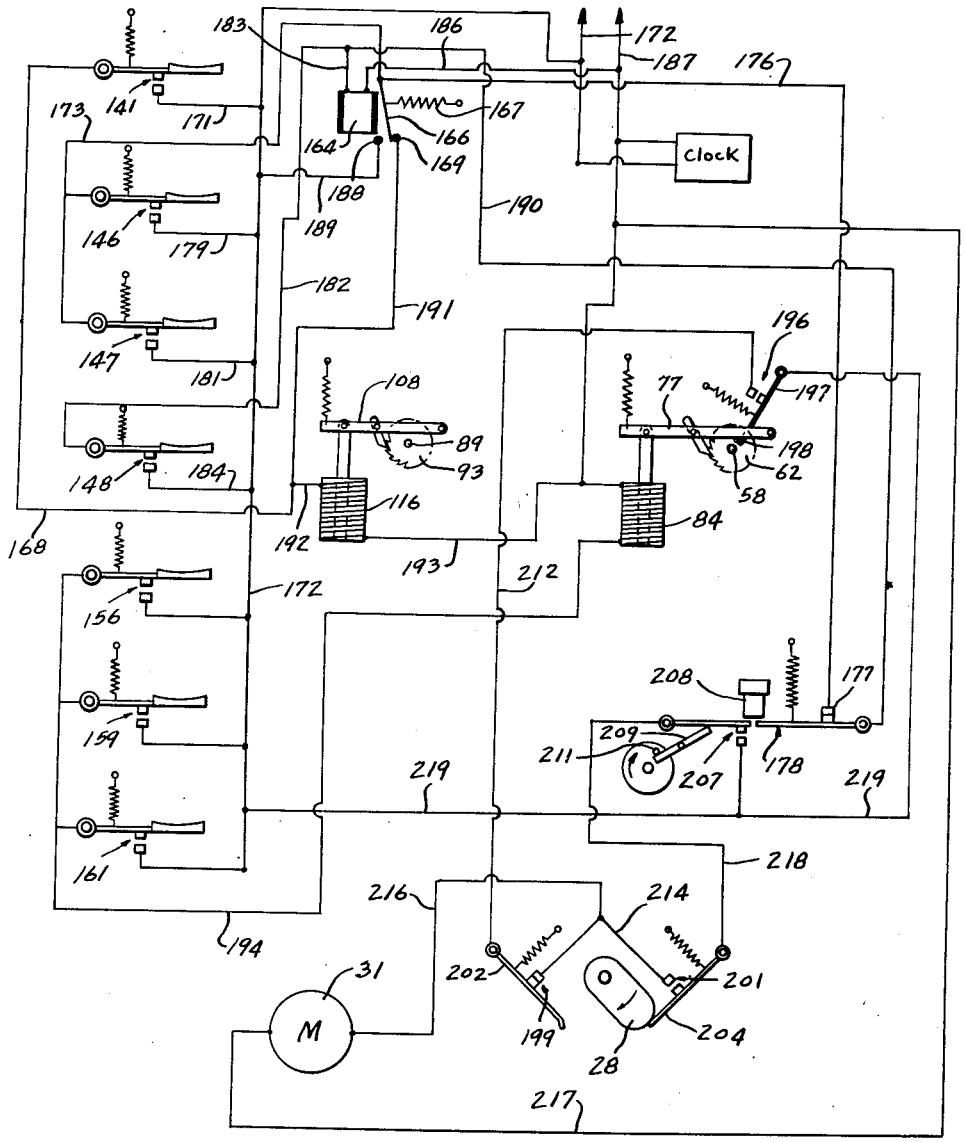
Fig. 12 is a wiring diagram, drawn in wholly diagrammatic manner and showing the position of the several parts and switches when the machine is ready to commence the policy issuing cycle; and, Fig. 13 is a wiring diagram of a modified form of apparatus for issuing policies in only two zones.

Referring now more particularly to the wiring diagram, Fig. 12, the correlation of the various switches and the remainder of the mechanism already described may now be explained. Mounted on the plate 144 is a relay 164 controlling a movable contactor arm 166. Arm 166 is biased outwardly of the coil of the relay by means of a spring 167.

Commencing with switch 141, it will be seen that the movable arm contactor thereof is connected through a circuit 168 to a stationary contact 169 which is normally engaged by the free end of the contact arm 166. The fixed contact of switch 141 is connected by a short lead 171 to one of the power supply lines 172. Switch 146 is connected by a line 173 to the pivoted end of the blade or arm 166. The pivoted end of the blade 166 is connected through a line 176 to the stationary contact 177 of a switch 178 mounted on a side of the machine. See also Fig. 1. Switch 178 is spring biased to closed position. The stationary contact of switch 146 is connected to the power supply line 172 by a short lead 179.

Switch 147 is connected similarly as switch 146, the stationary contact thereof being connected by a short lead 181 to the power supply line 172.

Switch 148 is the control switch for energizing the relay 164. As shown, the movable arm thereof is connected by a lead 182 to one lead 183 of the coil of the relay 164. The stationary contact of switch 148 is connected by a short lead 184 to the supply line 172. The other lead 186 of the relay coil 164 is connected to the other power supply line 187. The second stationary contact of the relay, indicated at 188, is connected to the power supply line 172 through a short lead 189. The movable contact arm of switch 178 is connected through a lead 190 to the lead 183 of the relay coil 164.

The contact 169 of the relay is connected through a lead 191 to one lead 192 of the solenoid 116, which will be remembered is the zone actuating solenoid. The lead 192 of the solenoid is connected through the circuit 168 to the movable arm of the switch 141. The opposite lead from the solenoid winding connects through a line 193 to the power supply line 187.

The switches 156, 159 and 161 are all arranged to momentarily energize the amount solenoid 84. As shown, the movable arms of each of these switches is connected through a lead 194 to one side of the coil of the solenoid 84 and the stationary contacts thereof are connected as shown by the short leads to the power supply line 172. The opposite side of the solenoid winding 84 is connected to the power supply line 187.

Referring again to Fig. 3 of the drawings it will be seen that mounted on the plate 57 is a switch 196 having a switch arm 197. The arm 197 projects in the path of a pin 198 carried by the amount wheel 59. When the amount wheel 59 is in the position shown in Fig. 3, which position is also illustrated in Fig. 12, the pin 198 contacts the arm 197 and opens switch 196.

Referring now more particularly to Fig. 2 of the drawing it will be seen that there are switches 199 and 201 mounted on the frame plate 12 of the machine. The switch 199 has a switch arm 202 carrying a roller 203 which is disposed in the path of the roller 28 of the driven Geneva motion member 27. In similar manner switch 201 carries a switch arm 204 having a roller 206 in the path of the roller 28. Both of the switches 199 and 201 are spring biased toward closed position. Whenever the roller 28 contacts the roller 206 or 203 the respective switch is opened. Mounted on a side of the machine, immediately adjacent switch 178 is a snap type switch 207. The switches 178 and 207 are under the control of a manually operated push button 208 which is adapted to be actuated by the operator of the machine as will presently appear. Switch 207 is automatically opened at the end of a cycle of operation of the apparatus by means of a pivoted arm 209 which is engaged by a pin 211 disposed on a rotating part of the apparatus.

The normally open switch 196 is in series with the switch 199 through a lead 212 in the manner shown in Fig. 12. The stationary contacts of switches 199 and 201 are connected by a lead 214 and this lead is in turn connected through a circuit 216 to one side of the motor 31. The opposite side of the motor 31 is connected through a lead 217 to the power supply line 187. The movable contactor of switch 201 is connected through a lead 218 to the movable contact arm of switch 207. The movable contact arm of switch 196, and the stationary contacts of switch 207 are connected through a line 219 to the power supply line 172.

From the foregoing the construction and operation of my improved apparatus may now be explained and understood. It will be apparent from an inspection of the wiring diagram that the machine is designed to issue a policy of insurance in what may be called a two cycle operation. That is, when a token is first dropped into any of the chutes, the motor 31 is energized for a first riod of operation and then is automatically stopped. This accomplishes primarily two purposes. First, during the first period of energization of motor 31 moves the cover plate 38 rearwardly of the apparatus, that is, to the right as viewed in Fig. 2, uncovering the space on the policy form wherein the operator is to write in data. Second, the hammer shaft 46 is rocked clockwise as viewed in Fig. 2, cocking the hammers and readying them for striking movement due to the action of certain springs associated with the shaft 46, not shown.

With the various switches and parts of the mechanism in the position shown in Fig. 12, it will be seen that when a token is inserted in the chute 126 switches 141, 146, 147, 148 and 156 are momentarily closed in the sequence named. Closing of switch 141 energizes the solenoid 116 for a moment, causing the rotation of the associated shaft 89, rotating quadrant 91 into position for the pad of type 92 carrying the indicia B to come into printing position. In its passage down the chute the token as stated, momentarily closes switch 146 and this again momentarily energizes solenoid 116, moving the indexible zone wheel to position to bring the letter A into printing position. Switch 147 is also closed and also again energizes solenoid 116 but, due to the upper end of the quadrant 91 striking the stop 95, closing of switch 147, after switches 141 and 146 have been closed is ineffective to cause further rotation of shaft 89. The closing of switch 148 energizes the coil of the holding relay 164, causing the movable arm 166 thereof to move out of engagement with contact point 169 and into engagement with contact point 188. It will be apparent that this establishes a holding circuit for the relay 164 through the switch 178, as will be apparent from an inspection of the wiring diagram. It will be remembered that at this time switch 178 is closed and therefore the coil of the relay 164 remains energized until switch 178 is opened.

The closing of switch 156 causes momentary energization of relay 84, which is connected through the means shown to the amount printing wheel. Upon downward movement of arm 77 the amount wheel 59 is rotated, moving pin 198, permitting switch 196 to be closed under the influence of the spring associated with the arm 197 thereof. This establishes a circuit through switch 199 to the motor 31, causing the motor to rotate. During the first period of energization the member 209 is rocked to a position to snap open switch 207. When roller 28 moves from the position shown in Fig. 12 to a position to open switch 199, the first period of energization of motor 31 is terminated. At the end of the first period, cover plate 38 is withdrawn from over the heading of the form, the hammers are cocked ready for striking movement and the switch 207 is opened, ready for manual closing in response to downwardly movement of the operator's button 208. The operator now writes in the data called for on the heading of the form, and, if more insurance than the minimum amount is desired he inserts additional tokens in the slot A. It will be noted that upon movement of the arm 166 of the relay into contact with stationary contact 188, switches 146 and 147 are thrown out of the circuit and are wholly ineffective for any purpose.

Having completed the filling out of the data on the form the operator now pushes the manually operated button 208, closing switch 207 and opening switch 178. The opening of switch 178 immediately de-energizes the coil of relay 164, permitting the spring 167 to return the movable contact arm 166 into engagement with the stationary contact 169. Closing of switch 207 establishes a circuit through the now closed switch 201 to the motor, energizing the motor for its second period of energization. This period lasts until the roller 28 moves around to again open switch 201. The hammers snap forwardly, printing the information on the form and the original copy of the form is fed outwardly of the machine. During this period of energization the movable portion of the ribbon shifting mechanism moves as indicated by the arrows, Figs. 3 and 4, striking the projections 68 and 104, permitting the springs 72 and 94 to return the amount wheel and zone quadrant. If desired, the original copy F' of the form may be fed between a vertically reciprocable shear blade 221 and a stationary blade 222, whereby the form is mechanically sheared off. It will be understood that the movable shear blade 221 has associated therewith mechanism, not shown, to cause the same to reciprocate up and down at the proper time, and that this mechanism is powered by the electric motor 31.

In the event a token is dropped into chute 127, representing zone B, the first switch closed is switch 147, since its arm is common to the chutes 126 and 127. The closing of switch 147 is effective for the same purpose just described, namely to energize the solenoid 116 and thus to move the zone printing quadrant into position for the letter B to be printed upon the policy. The closing of switch 148 is effective to energize the relay 164 and shift the movable arm 166 thereof into engagement with contact 188. Continued downward movement of the token momentarily closes switch 159, energizing the form issuing apparatus proper in the manner already stated, and also, by setting the amount wheel, energizes the motor 31. If it now be assumed that the operator of the machine makes an attempt to cheat the same by putting into slot 126 a lower value token it will be seen that the closing of switch 141 is still effective to again energize the zone solenoid 116, causing the zone quadrant to move up so as to print the letter A, representing the lower zone. However, if the operator operates the machine as it is supposed to be operated, the insertion of additional B tokens into chute 127 is ineffective to cause further energization of solenoid 116 because switch 147 has been thrown out of circuit due to movement of the movable contact arm 166. Thus, so long as the operator operates the machine in an honest manner, that is, by using tokens of a single denomination and placing them in the correct slot of the plate 129, he gets precisely what he pays for. On the other hand, an attempt to cheat the machine by the selective insertion of tokens of different value results in the policy being issued for the zone corresponding to the lowest value token inserted.

The chute 128 is provided with the single switch 161 which is effective only to initiate the form issuing apparatus proper. It will be remembered that this is made possible because of the fact that in the lowermost or initial position the quadrant 91 is set to print the letter C representing the higher zone on the policy without any indexing thereof whatever. Therefore, one may drop from one to the maximum number, in the case shown, five, tokens in chute 128 and these are effective only to index the amount printing mechanism and to commence the operation of motor 31. Similarly, one may insert up to five tokens of the correct denomination in chutes 126 and 127 and obtain a policy having a face value in accordance with the number inserted.

In connection with the higher priced tokens represented by zone C and slot 128, it will be seen that should one drop in say one of these tokens and then drop into the machine a B token, the zone quadrant will be indexed to print B; should one drop in first a C token, and then an A token, the zone quadrant will be indexed to print zone A; it therefore follows that due to the outlocking arrangement of the switches 146 and 147 afforded by switch 148 and the relay, cheating of the machine by selective insertion of tokens of different denominations is effectively prevented.

Figure 13:
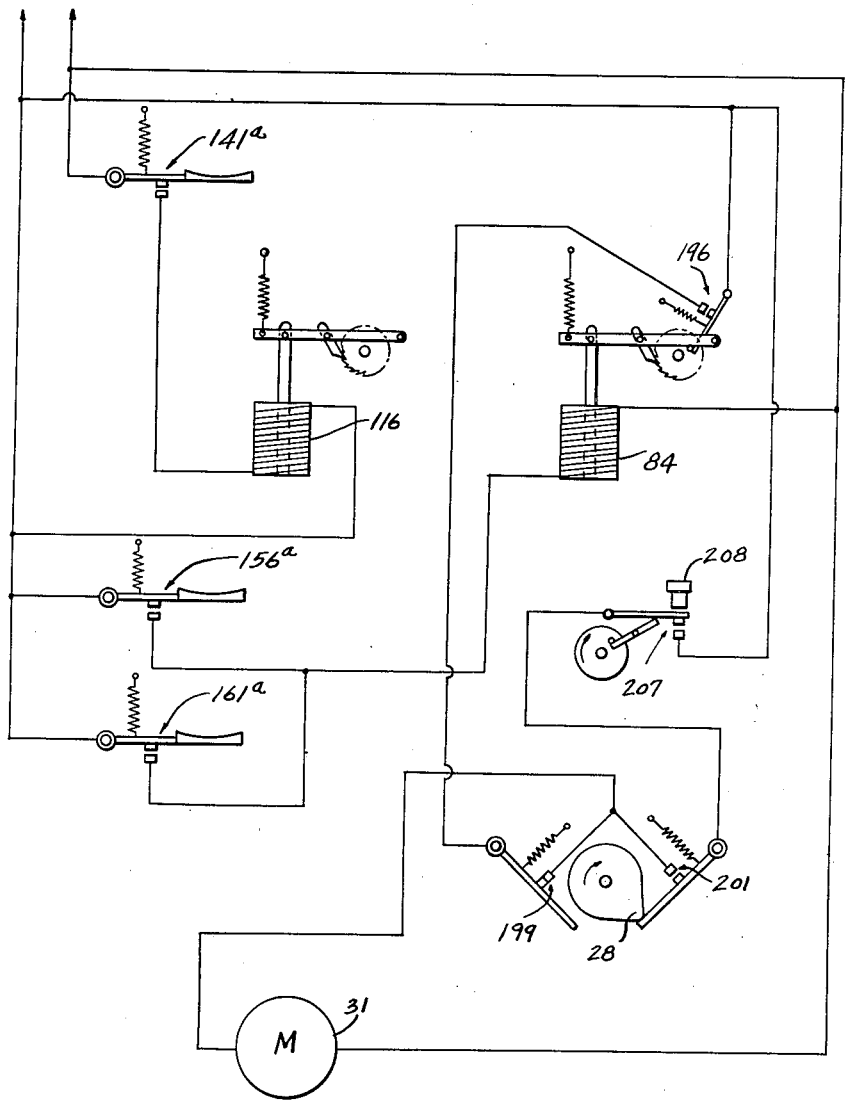

Referring now particularly to Fig. 13 of the drawing I show a modified form of my invention in which the mechanism is especially adapted to issue insurance policies effective for only two zones which may be the zones A and C, or any other designation desired therefor. In this instance the circuits are considerably simplified over those required for three zone operation as will become apparent. Thus, the only switch required for association with the zone solenoid 116 is a switch 141a, placed so as to be actuated when tokens are dropped into the chute 126. This completes the circuit as shown, and indexes the quadrant 91 to a position to print the letter A on the policy. It will be understood that in the modification being described the letter C remains always in position until the zone mechanism is indexed due to energization of the solenoid 116.

At the lower end of the chute 126, for the modification now being described one may employ a switch 156a. This switch is in circuit with the solenoid 84 of the amount mechanism.

At the lower end of chute 128 one may employ a token actuated switch 161a, likewise disposed to form a circuit through the solenoid 84.

Other than as described the remaining portions of the circuit are the same as those shown in Fig. 12. It will be noted that if only two zones are required I eliminate the relay 164 and greatly simplify the wiring. Further, it will be seen that should one drop in first a C token and then follow the same by an A token the zone mechanism will be indexed to print A on the policy, causing it to be issued for the lower zone. The outlocking arrangement is not necessary with the modification shown in Fig. 13 since if one drops in an A token first and follows the same by a C token, the printing mechanism is set to print the letter A. It will be noted that with respect to the switches 156, 156a, 159, 161 and 161a, it would be possible to have a common switch to take the place of all these switches in the two modifications. That is, by having a single switch at the lower end of the series of coin chutes, one could accomplish the same results shown with the three switches in Fig. 12 and the two switches shown in Fig. 13. However, my reason for employing a separate switch for each coin chute is so that the tokens may be collected in separate containers, facilitating the separation of the same for reuse in the apparatus. It will also be noted that in Fig. 13 I eliminate entirely the switch 178 since I have eliminated the solenoid 164.

From the foregoing it will be apparent that I have devised and improved apparatus for issuing paper forms. My improved selector mechanism for indexing the zone printing means and the amount printing mechanism is simple of construction and highly effective. It will also be apparent that my improved arrangement of the indexible zone and amount mechanisms has utility in association with types of form issuing apparatus other than the kind specifically disclosed herein. For instance, in the co-pending application of William W. Harper and Lloyd E. Gilbert, Serial No. 67,207, filed December 24, 1948, for Form Issuing Apparatus, now Patent No. 2,612,976, issued October 7, 1952, there is shown, described and claimed a somewhat different type of form issuing apparatus with which my improved token or coin actuated mechanism may be associated. In this specification therefore I have attempted to describe only so much of the actual form issuing apparatus as I consider to be essential to an understanding of the improvements shown, described and to be claimed herein.

At all events, it will be seen that I have provided an improved customer operated, token actuated zone insurance policy apparatus. In practice I have found my invention to be rugged enough to withstand the uses to which such machines are generally subjected when put in public places and simple enough to be operated by the average customer without undue complications.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with apparatus for issuing forms wherein the form is fed from the apparatus by an electric motor, of means for printing indicia on the form while in the apparatus and indicating thereon monetary value and territorial extent comprising a pair of solenoid actuated indexible printing members, one of said members carrying indicia indicating monetary value and the other carrying indicia indicating territorial zones, a pair of token chutes disposed to receive tokens of different value, a momentarily closeable token actuated switch associated with the chute which is adapted to receive tokens of the lowest value and in circuit with the solenoid of the zone indicating member, other switch means closeable upon the insertion of a token in each chute in circuit with the solenoid of the value indicating member, and means operable in response to the insertion of a token in either chute to energize the electric motor and initiate issuance of a form from the apparatus.

2. In form issuing apparatus, electrically actuated indicia printing mechanism, a token chute disposed to receive tokens, a first momentarily closeable token actuated electric switch associated with said token chute and in circuit with said indicia mechanism and a source of E. M. F. electric circuit interrupting means in circuit with said first switch and said indicia printing mechanism, and another token actuated switch associated with the chute effective upon the insertion of a first token therein to energize the circuit interrupting means and thereby render the closing of the first named switch ineffective to further index the indicia mechanism in response to subsequent closing of said first switch.

3. In indexible indicia printing mechanism, a solenoid operatively connected to the indicia mechanism and effective upon momentary energization to index the same step by step from an initial high value indicating position to one of lower value, a plurality of token chutes for receiving tokens of high and lower value corresponding to said indicia, a first token actuated momentarily closeable electric switch associated with the lower value token chute, circuits within which the first switch and the solenoid are included, a second electric switch associated with the high value token chute and likewise in circuit with the solenoid, a third token actuated switch common to both chutes and momentarily closeable upon the insertion of a token in either chute, a normally de-energized electrically actuated circuit breaker controlling the circuits in which are located the first named chute switches and said solenoid and effective when energized to render ineffective said first and second switches, circuits including the third switch and the circuit breaker, and sources of E. M. F. for said circuits.

4. Apparatus as defined in claim 3 in which the circuit breaker is provided with a normally open holding circuit completed by the closing of the switch common to said chutes, and in which there is a normally closed manually openable switch in the holding circuit.

5. The combination with form issuing apparatus powered by electric drive means and having means to feed a form in printing relation to a printing platen, of a pair of separately indexible electrically powered indicia carrying members the indicia of which when printed on the form convey correlated information, the indicia of said members being indexibly brought into printing relation relative to the platens, separate token actuated electric switches controlling the actuation of the indexible members, another switch closeable upon actuation of one of said indexible members and effective to energize the electric drive of the form issuing apparatus and thereby initiate the issuance of a form from the apparatus, a token chute, and means positioning said token actuated switches for sequential closing upon the insertion of a token in said chute.

6. Apparatus as defined in claim 5 in which means is provided rendering ineffective the token actuated switch controlling one of said indexible mechanisms in response to the insertion of a first token in said chute, whereby only the other of said indexible mechanisms is actuated upon the insertion of a second token.

7. Apparatus as defined in claim 6 in which the one of said switches remaining effective is the one controlling the indexible member having associated therewith the switch controlling the electric drive means of the form issuing apparatus.

8. In token controlled apparatus for printing indicia representing the face value and effective territorial zones on policies of insurance while in a policy issuing apparatus, a printing member carrying indicia thereon representing the amount of the policy, a solenoid operatively connected to the amount member and disposed upon each momentary energization thereof to index the member step by step to bring the indicia thereon into position for printing, a second printing member carrying at least three separate indicia thereon representing territorial zones and normally set to print on the policy the indicia representing the zone of greatest territorial extent, a second solenoid operatively connected to the zone member and disposed upon momentary energization to index the zone member step by step from its normal high zone indicating position to lower zone indicating positions, at least three token chutes disposed to receive tokens corresponding in value to the zone indicia on said zone member, electric switches associated with the chutes of the lowest and intermediate zone chutes momentarily closeable upon the insertion of tokens therein, circuits connecting the switch of the lowest and intermediate zone chutes to the solenoid of the zone indicating member, other switch means in circuit with the solenoid of the amount member and momentarily closeable upon the insertion of a token in any one of the chutes, and means operable after the insertion of a single token in the lowest zone chute rendering the subsequent closing of the switch of the lowest zone chute ineffective to further index the zone member.

9. Apparatus as defined in claim 8 in which a circuit interrupter is provided in the circuit between the token actuated zone switch of the intermediate token chute and the zone indicating member effective upon the insertion of a first token in the intermediate zone chute to render the insertion of subsequent tokens ineffective to further index the zone indicating member.

References Cited in the file of this patent

UNITED STATES PATENTS

| Number | Name | Date |
|---|---|---|
| 2,384,585 | Alexander | Sept. 11, 1945 |
| 2,612,976 | Harper | Oct. 7, 1952 |